(12) United States Patent
Nieman

(10) Patent No.: US 7,762,370 B2
(45) Date of Patent: Jul. 27, 2010

(54) ASSEMBLY FOR A MOTORIZED VEHICLE

(75) Inventor: Jason A. Nieman, Rudolph, WI (US)

(73) Assignee: Pirate Motorsports, Inc./All American Manufacturing, LLC, Lyman, WY (US)

( * ) Notice: Subject to any disclaimer, the term of this patent is extended or adjusted under 35 U.S.C. 154(b) by 209 days.

(21) Appl. No.: 12/012,113

(22) Filed: Jan. 31, 2008

(65) Prior Publication Data
US 2008/0185206 A1 Aug. 7, 2008

Related U.S. Application Data

(60) Provisional application No. 60/887,785, filed on Feb. 1, 2007.

(51) Int. Cl.
*B62K 11/04* (2006.01)
(52) U.S. Cl. .................. 180/227; 180/230; 280/284; 280/285
(58) Field of Classification Search .............. 180/227, 180/230; 280/284–285
See application file for complete search history.

(56) References Cited

U.S. PATENT DOCUMENTS

| | | | | |
|---|---|---|---|---|
| 4,616,729 A | * | 10/1986 | Kasai | 180/231 |
| 4,645,028 A | * | 2/1987 | Kawashima | 180/227 |
| 4,655,310 A | * | 4/1987 | Hoshi | 180/219 |
| 6,347,803 B1 | * | 2/2002 | Berges | 280/260 |
| 7,559,396 B2 | * | 7/2009 | Schwindt | 180/227 |

* cited by examiner

*Primary Examiner*—Lesley Morris
*Assistant Examiner*—Michael R Stabley
(74) *Attorney, Agent, or Firm*—Thomas J. Connelly; Wilhelm Law, S.C.

(57) ABSTRACT

An assembly for a motorized vehicle is disclosed which includes a frame, a power source mounted to the frame, and a transmission connected to the power source. The assembly also includes a swing arm attached to the frame at a pivot point located between the power source and the transmission. The swing arm enables a rear wheel of the vehicle to move vertically relative to the frame. The assembly can also include a suspension system for cushioning the ride of the motorized vehicle and a safety mechanism which has to be manually activated before the vehicle can vertically move from a first, riding position to a second, parked position.

20 Claims, 8 Drawing Sheets

US 7,762,370 B2

ASSEMBLY FOR A MOTORIZED VEHICLE

CROSS REFERENCE TO RELATED PATENT APPLICATIONS

This patent application is a regular patent application claiming priority to U.S. Provisional Patent Application 60/887,785, filed Feb. 1, 2007.

FIELD OF THE INVENTION

This invention relates to an assembly for a motorized vehicle which can be used to construct a motorcycle, a motorized bike, a scooter, etc.

BACKGROUND OF THE INVENTION

Motorcycles, all terrain vehicles (ATV's), three wheelers, motorized bikes, scooters, etc. are available today in a wide variety of styles and configurations. Cruiser style motorcycles have been popular with motorcycle riders for decades. This popularity has spawned the development of customized cruiser style motorcycles. The customized cruiser style motorcycles have now developed into another motorcycle genre, the fully customized motorcycle.

One popular configuration of a fully customized motorcycle is a category of motorcycles with a frame having no rear suspension. This style is typically referred to as a rigid frame motorcycle. One of the primary reason motorcycle builders like to construct this style of motorcycle is that it has a rather clean, simplistic appearance. However, as one might suspect, a rigid frame motorcycle does generate a stiffer and harsher ride and some rigid frame motorcycles exhibit rather poor handling characteristics. To counter the stiff ride, some motorcycle builders and manufacturers have constructed motorcycles that have a rear suspension but the rear suspension is not visible or has very few visible components. This style of motorcycle frame is sometimes referred to as a "soft tail".

Many soft tail style motorcycles utilize a swing arm that has limited travel because of the appearance and/or geometry of the frame. Consequently, some soft tail style motorcycles have a poorer quality ride when compared to motorcycles with a conventional swing arm.

Likewise, certain recreational vehicles like three wheelers, ATV's, scooter, motorized bicycles, etc. utilize frame assemblies with one or more swing arms attached. By rearranging the location and pivot point of such swing arm(s) one can design and manufacture a smoother riding vehicle or a vehicle with a different profile and/or appearance.

Now an assembly has been invented for a motorized vehicle which utilizes a relatively longer, travel suspension setup so as to improve the ride quality and comfort of the vehicle, especially a motorcycle, while minimizing the number of visible suspension components.

SUMMARY OF THE INVENTION

Briefly, this invention relates to an assembly for a movable or motorized vehicle, which includes a frame, a power source mounted to the frame, and a transmission connected to the power source. The assembly also includes a swing arm attached to the frame at a pivot point located between the power source and the transmission. The swing arm enables a rear wheel of the vehicle to move vertically relative to the frame.

In a second embodiment, this invention relates to an assembly for a movable or motorized vehicle which includes a frame having a first member with spaced apart ends and a pair of frame rails each having a first end and a second end. The first ends of the pair of frame rails converge towards one another and are secured to one end of the first member. The second ends of the pair of frame rails are laterally spaced apart from each other and are secured to the other end of the first member. The assembly also includes a power source mounted to the frame and a transmission connected to and located rearward of the power source. A pair of brackets is present, each of which is secured to one of the pair of frame rails, and a movable pin extends between the pair of brackets. The movable pin establishes a pivot point located between the power source and the transmission. The assembly further includes a swing arm having a first end attached to the movable pin and a second bifurcated end extending rearward from the first end. The second bifurcated end supports a rear wheel of the vehicle that can move vertically relative to the frame.

In a third embodiment, this invention relates to a motorcycle frame and suspension system which includes a frame having a first member with a unitary front portion and a bifurcated rear portion and a pair of frame rails each having a first end and a second end. A steering neck secures the unitary front portion of the first member to the first ends of each of the pair of frame rails. The second ends of each of the pair of frame rails are laterally spaced apart and are secured in spaced apart locations to the bifurcated rear portion of the first member. The motorcycle and suspension system also includes an internal combustion engine mounted to the frame and a transmission connected to the internal combustion engine and mounted to the frame rearward of the internal combustion engine. The motorcycle and suspension system further includes a pair of brackets each secured to one of the pair of frame rails. Each of the pair of brackets is located between the internal combustion engine and the transmission. A swing arm is also present which has a first end pivotably attached to the pair of brackets and a second bifurcated end extending rearward from the first end. The second bifurcated end supports a rear wheel of the motorcycle that can move vertically relative to the frame. Lastly, a suspension system is present which includes an air bag and a shock absorber mounted between the swing arm and the first member. The air bag and shock absorber are both positioned rearward of the transmission. The air bag allows the motorcycle to move from a first riding position to a second parked position while the shock absorber provides a cushioned and comfortable ride to the driver and passenger of the motorcycle.

The general object of this invention is to provide an assembly for a movable or motorized vehicle. A more specific object of this invention is to provide a motorcycle frame and suspension system which uses few, if any, visually conspicuous rear suspension components, whilst at the same time offering a relatively long travel suspension setup so as to improve ride quality and comfort.

Another object of this invention is to provide an assembly for a motorized vehicle which uses a relatively long travel suspension setup to improve the handling characteristics of the vehicle.

A further object of this invention is to provide a motorcycle frame and suspension system which uses an air bag connected between the frame and a movable swing arm to provide for ride height adjustability as well as permitting the motorcycle to be parked with a portion of the frame contacting the underlying supporting surface, i.e. the ground.

Still another object of this invention is to provide a motorcycle frame and suspension system that utilizes a suspension setup that can pivot from a point located between the engine and the transmission so as to increase ride quality and comfort.

Still further, an object of this invention is to provide a motorcycle frame and suspension system that allows for a sleek motorcycle profile with a low appearance while being parked and which employs a safety mechanism which prevents the motorcycle from being lowered to the ground while being driven.

Other objects and advantages of the present invention will become more apparent to those skilled in the art in view of the following description and the accompanying drawings.

DETAILED DESCRIPTION OF THE INVENTION

Figure 1:
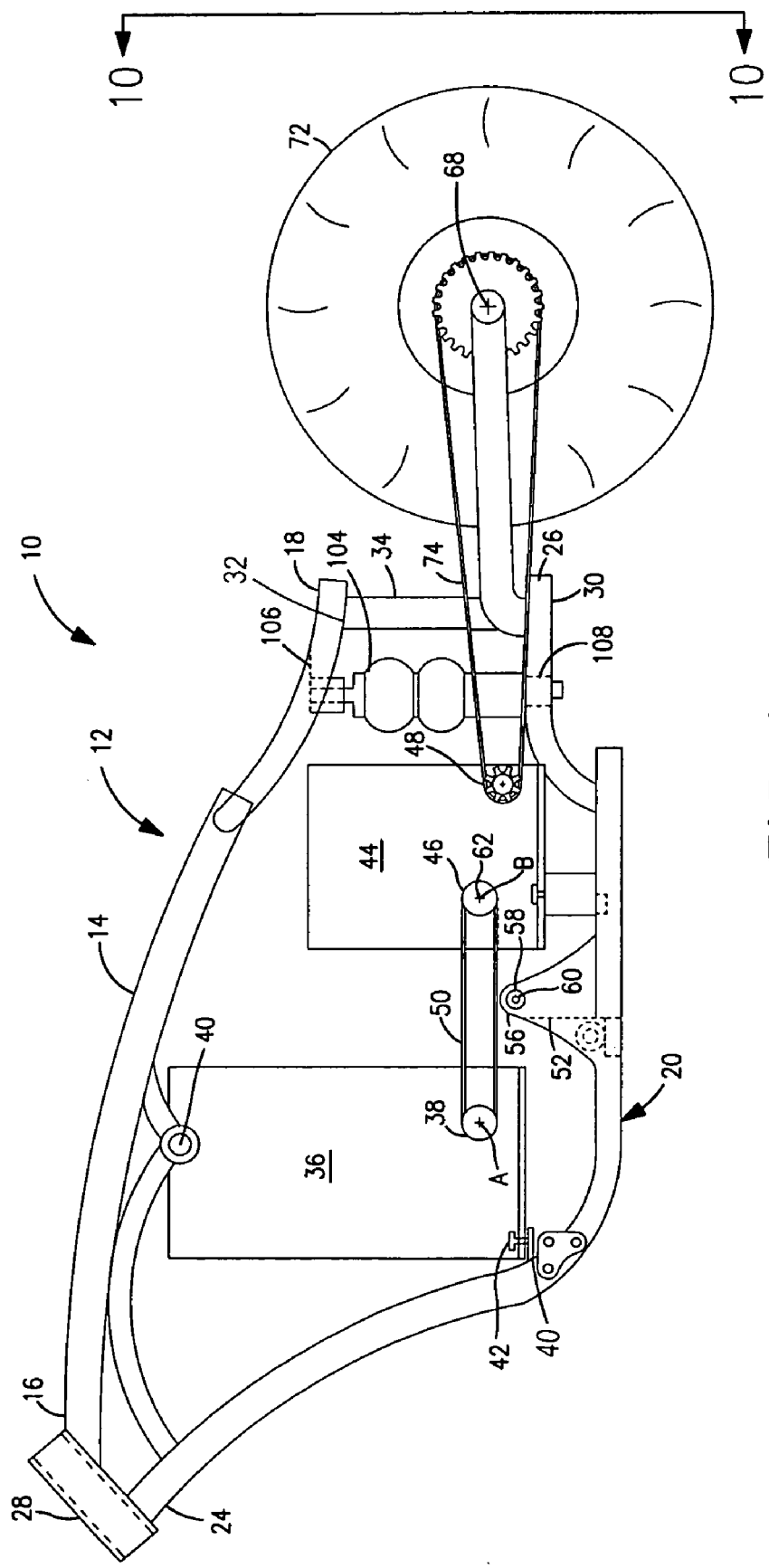
FIG. 1 is a side view of an assembly for a movable vehicle, showing a frame, a power source mounted to the frame, a transmission connected to the power source, a swing arm attached to the frame at a pivot point located between the power source and the transmission which enables a rear wheel to move vertically relative to the frame, and a suspension system located rearward of the transmission.
Figure 2:
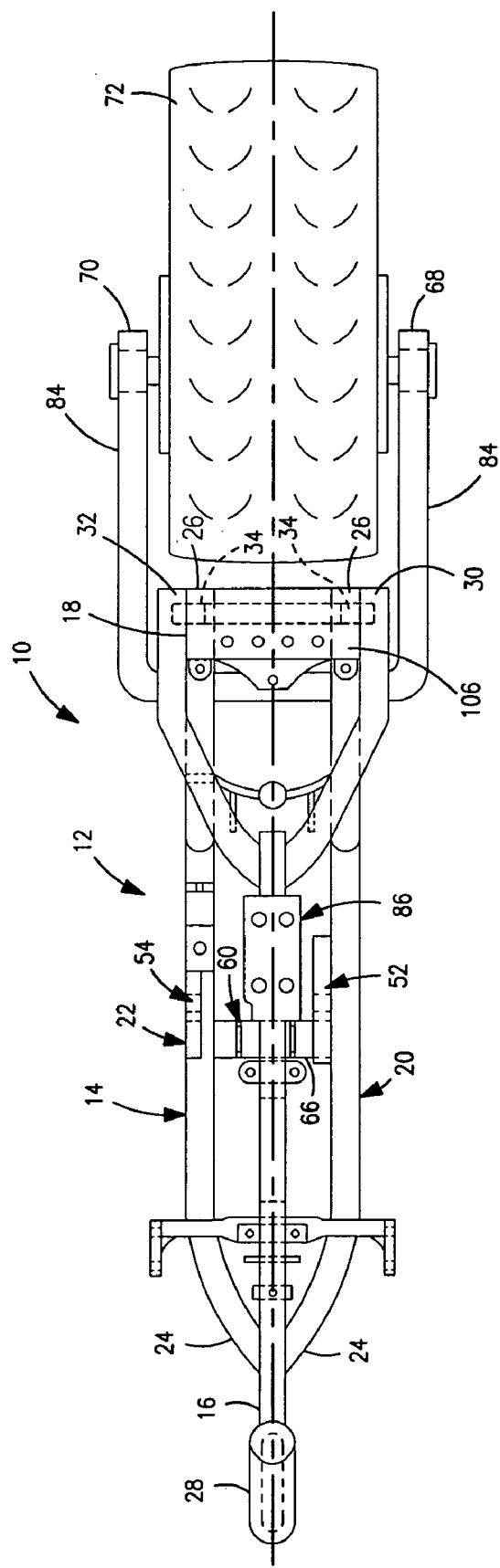
FIG. 2 is a top view of the assembly depicted in FIG. 1 with the power source, the transmission and the suspension system removed.

Referring to FIGS. 1 and 2, an assembly 10 is shown which can be used to form a movable or motorized vehicle. For example, the assembly 10 can be used to construct a motorcycle, a scooter, a moped, a motorized bicycle, a three or a four wheel all terrain vehicle (ATV), a utility vehicle, etc. The assembly 10 is especially adapted for a two wheel motorcycle but can be adapted for a three wheel motorcycle as well.

The assembly 10 includes a frame 12 having a longitudinal centerline X-X, see FIG. 2. The frame 12 has a first member 14 with a first end 16 and a second end 18. The first and second ends, 16 and 18 respectively, are spaced apart from one another with the first end 16 designed to be positioned toward the front of the vehicle and second end 18 designed to be positioned rearward of the first end 16. The first end 16 is depicted as having a unitary configuration while the second end 18 has a bifurcated configuration. The assembly 10 also includes a pair of frame rails 20 and 22, each having a first end 24 and a second end 26. The first and second ends, 24 and 26 respectively, are spaced apart from one another. The assembly 10 further includes a steering neck 28. The steering neck 28 secures the unitary first end 16 of the first member 14 to the first ends 24 of each of the pair of frame rails 20 and 22. The steering neck 28 serves as a pivotable support for the suspension of a front wheel, not shown. The pair of frame rails 20 and 22 diverge from each other as they move away from the first end 24 and the second ends 26, 26 of each of the pair of frame rails 20 and 22 are laterally spaced apart in a parallel relationship. The second ends 26, 26 are secured at spaced apart locations to said bifurcated second ends 18, 18 of said first member 14. The first member 14 can be directly or indirectly secured to the second ends 26, 26 of the pair of frame rails 20 and 22. In FIG. 1, the second ends 18, 18 of the first member 14 are secured to the second ends 26, 26 of the pair of frame rails 20 and 22 by a pair of vertical supports 34, 34 at locations 30 and 32.

The assembly 10 can be constructed of various materials which are suitably strong and durable for normal intended use. The materials can include but are not limited to: aluminum, steel, stainless steel, iron, cast iron, titanium, magnesium, brass, zinc, as well as any alloys of the above-mentioned materials. Common industry methods of forming such metals and alloys include but are not limited to: casting, forging, shearing, bending, machining, riveting, welding, powdered metal processing, extruding, etc. Portions of the assembly 10 can also be formed from one or more components made from a composite material including two or more materials, one of which can be fiberglass, graphite, plastic, etc. Common industry methods of forming such composite materials include but are not limited to: molding, heating, spraying, layering, etc. All of the above-identified materials are known to those skilled in the art for building, constructing and assembling motorized vehicles, especially motorcycles, scooters, mopeds, etc.

It should be understood that various parts or portions of the assembly 10 can be constructed out of similar or different materials. Typically, such components as bolts, nuts, screws, pins, studs, bushings, bearings, pin, shock absorbers, air cylinders, pistons, piston rods, seals, etc. are constructed from a different material than from which the frame 12 is constructed.

Desirably, the assembly 10 is made of materials which resist corrosion. Those skilled in the art are well aware of certain metallic and non-metallic materials which posses such desirable qualities and appropriate methods of forming such materials.

Referring now to FIG. 1, the assembly 10 also includes a power source 36, depicted as a rectangular box, mounted to the frame 12. The power source 36 can be an engine, such as a gas or diesel engine, a mechanical pump or motor, an electrical pump or motor, a hydraulic pump or motor, a pneumatic pump or motor, etc. Desirably, the power source 36 is an internal combustion engine. By "engine" it is meant a machine that converts energy into mechanical force or motion. By "motor" it is meant something, such as an engine, that produces or imparts motion; a device that converts any form of energy into mechanical energy. By "pump" it is meant a machine or device for raising, compressing or transferring fluids. The power source 36 can be a two stroke or a four stroke engine. The power source 36 can be a V-twin engine as is used in some motorcycles. The power source 36 has an output shaft 38 extending outward therefrom. The output shaft 38 can extend outward from various portions of the power source 36. Desirably, the output shaft 38 extends outward from a lower portion of the power source 36. The output shaft 38 can vary in length and dimension. The output shaft 38 can have a circular cross-sectional configuration with a constant diameter or it can be in the form of a polygon. Alternatively, the output shaft 38 can be a cylindrical shaft with one or more flat spots or surfaces. Normally a gear or sprocket is secured to the free end of the output shaft 38 onto which a chain, belt or some other mechanical mechanism can be attached so as to transmit power from the power source 36 to another member. The power source 36 is mounted to the frame 12 at one or more locations 40 by one or more kinds of fasteners 42. A fastener 42 in the form of a bolt is depicted in FIG. 1.

It should be understood that more than one fastener 42 can be used. Desirably, two, three or more fasteners 42 are typically utilized. The fasteners 42 can vary in size, length, shape and configuration. Common fasteners 42 include but are not limited to: bolts, nuts, screws, pins, studs, washers, lock washers, clamps, etc., and/or combinations thereof. The fasteners 42 can also include a vibration or damping component (not shown) which can be formed from a flexible or deformable material, or from non-metallic materials, including but not limited to: rubber, urethane, polyurethane, nylon, foam, and various polyolefins, such as polyethylene, high density polyethylene, polypropylene and high density polypropylene, etc. The fastener 42 can also be formed from other elastomeric or polymeric materials and can have various shapes, such as being formed as a bushing, a bearing, a post, etc. Such vibration or damping components can also be constructed from various polymers and copolymers including but not limited to: polyvinyl chloride, chlorinated polyvinyl chloride copolymers, polyamides, polycarbonates, etc.

For any polymeric material employed in the assembly 10, any conventional additive package can be included such as, for example and without limitation, slip agents, anti-block agents, release agents, anti-oxidants, fillers and plasticizers so as to assist in controlling processing of the polymeric material as well as to stabilize and/or otherwise control the properties of the finished processed product or to control hardness, bending resistance, and the like.

Common industry methods of forming such polymeric structures or components will suffice to form such non-metallic structures or components for the assembly 10. Exemplary but not limiting of such processes are the various commonly-known plastic converting processes.

Still referring to FIG. 1, the assembly 10 further includes a transmission 44 depicted as a rectangular box. By "transmission" it is meant an assembly including gears that transmit power from a power source, i.e. engine, to a drive axle. The transmission 44 is connected to the power source 36, i.e. the internal combustion engine, and is mounted to the frame 12 rearward of the power source 36. The transmission 44 has an input shaft 46 and an output shaft 48. Both the input shaft 46 and the output shaft 48 extend outward from the transmission 44. The input shaft 46 can be coaxially aligned with the output shaft 48 or be spaced apart therefrom. Desirably, the input shaft 46 is coaxially aligned with the output shaft 48. The input and output shafts, 46 and 48 respectively, can be cylindrical shafts of various lengths and cross-section. Desirably, both shafts 46 and 48 are cylindrical shafts having a circular cross-section with a constant diameter. However, like the output shaft 38 extending out of the power source 36, the cross-section of the input and output shafts, 46 and 48 respectively, of the transmission 44 can vary in configuration and can contain one or more flat surfaces or have a polygon cross-sectional shape, if desired. Like the output shaft 38 extending out of the power source 36, the input and output shafts, 46 and 48 respectively, of the transmission 44 can have a gear, sprocket, etc. secured thereto. The gear, sprocket, etc. can be mechanically connected, such as by a chain, a linked chain, a belt, a drive belt, etc., to another member. For example, the input shaft 46 of the transmission 44 is attached to the output shaft 38 of the power source 36. In FIG. 1, the mechanical connection is in the form of a linked chain 50. The chain 50 functions to transfer mechanical power from the power source 36 to the transmission 44. It should be understood that one or more belts, a drive belt, engaging gearing or sprockets, drive shafts, etc. can be substituted for the chain 50 to accomplish the same function.

Figure 3:
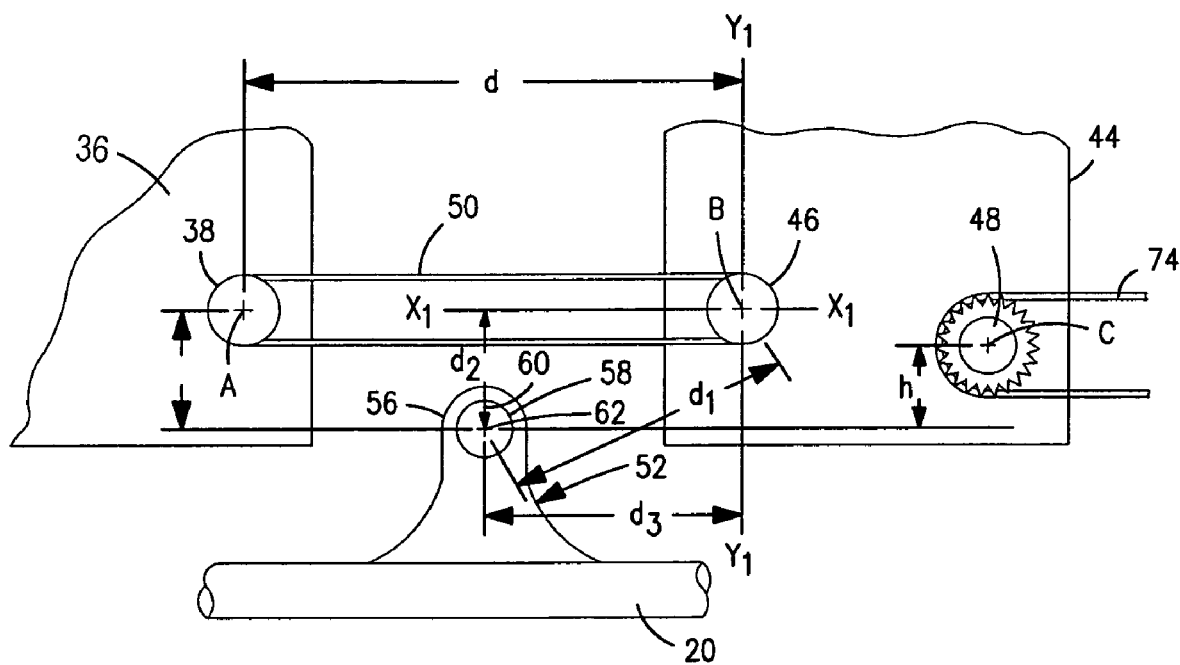
FIG. 3 is a partial exploded view of the power source and transmission showing the relationship of the output shaft of the power source, the input and output shafts of the transmission, and the pivot point of the swing arm.

Referring now to FIGS. 1 and 3, it should be understood that the power source 36 is located forward of the transmission 44. In FIG. 1, the power source 36 is located closer to the front of the assembly 10 and the transmission 44 is located closer to the rear of the assembly 10. In other words, the power source 36 is positioned in front of the transmission 44. In addition, as depicted in FIGS. 1 and 3, the output shaft 38 of the power source 36 has a central axis, indicated by the letter A, and the input shaft 46 of the transmission 44 has a central axis, indicated by the letter B. The central axis A is located forward of the central axis B. The exact location, measured vertically and horizontally, of the output shaft 38 of the power source 36 relative to the location of the input shaft 46 of the transmission 44 can vary. For example, both of the shafts 38 and 46 can be aligned parallel to one another and both can be aligned perpendicular to the longitudinal central axis X-X of the frame 12. Alternatively, both of the shafts 38 and 46 can be aligned at an angle to one another. Still another alternative involves aligning the shafts 38 and 46 at an acute angle to the longitudinal central axis X-X of the frame 12.

The output shaft 38 of the power source 36 and the input shaft 46 of the transmission 44 can be aligned along a common horizontal plane. Alternatively, the output shaft 38 of the power source 36 can be vertically positioned above or below the location of the input shaft 46 of the transmission 44. Furthermore, in FIG. 3, the output shaft 38 of the power source 36 is shown spaced apart from the input shaft 46 of the transmission 44 by a horizontal distance d. The distance d can vary. Desirably, the distance d can range from between about 1 inch to about 24 inches. More desirably, the distance d can range from between about 1.5 inches to about 12 inches. Even more desirably, the distance d can range from between about 2 inches to about 8 inches. Most desirably, the distance d can range from between about 2.5 inches to about 6 inches.

Figure 4:
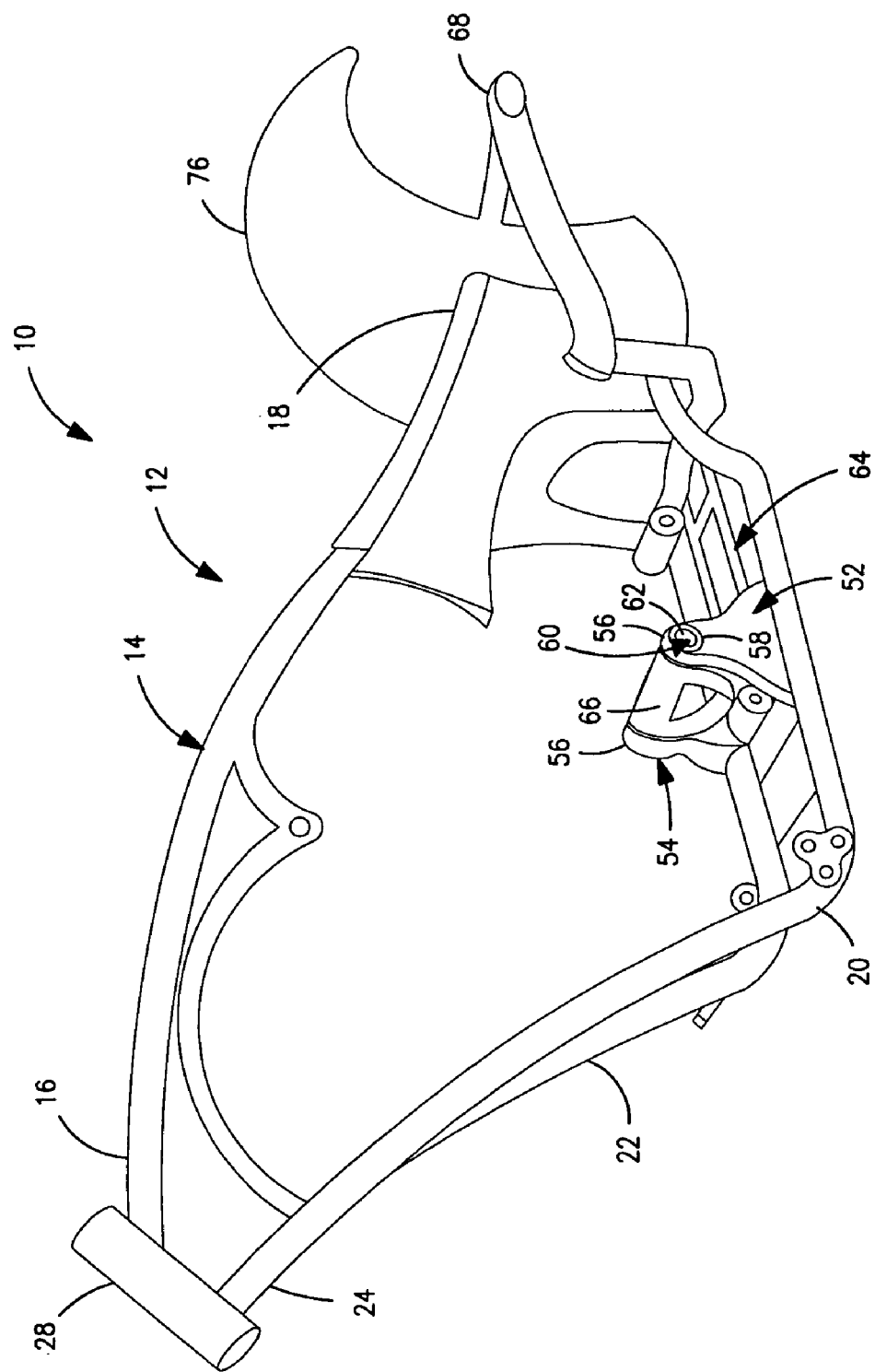
FIG. 4 is a perspective view of the assembly depicted in FIG. 1 without the rear wheel but showing a rear fender mounted to the frame.

Referring now to FIGS. 1-4, the assembly 10 also includes a pair of brackets 52 and 54 each secured to one of said pair of frame rails 20 and 22. As best shown in FIGS. 2 and 4, the first bracket 52 is secured, such as by a weld, to an inwardly facing surface of the frame rail 20 while the bracket 54 is secured to an upper surface of the frame rail 22. Each of the pair of brackets 52 and 54 can vary in size, shape and configuration but desirably, both are of the same size and configuration. It should be understood that each of the pair of brackets 52 and 54 can be secured to the same or to a different location on the respective frame rails 20 and 22. In FIGS. 3 and 4, each of the pair of brackets 52 and 54 is depicted as having a lobe or a rounded projection 56 with an aperture 58 formed therein.

Referring now to FIG. 4, a pivot pin 60 extends between the pair of brackets 52 and 54. The pivot pin 60 is mounted in the aperture 58 formed in each to the pair of brackets 52 and 54, such as by a bearing or bushing, so that it can freely rotate. The pivot pin 60 can be a solid or a hollow cylindrical member having a length which bridges between the pair of brackets 52 and 54 and has a diameter sized to mate with and rotate within each of the apertures 58. The pivot pin 60 establishing a pivot point 62 located between the power source 36 and the transmission 44. As best shown in FIG. 3, the pivot point 62 is located between the output shaft 38 of the power source 36, i.e. the internal combustion engine, and the input shaft 46 of the transmission 44. Expressed another way, the pivot point 62 is located forward of the input shaft 46 of the transmission 44. Desirably, the pivot pin 60 is aligned perpendicular to the longitudinal central axis X-X of the frame 12. Alternatively, the pivot pin 60 can be aligned at an angle to the longitudinal central axis X-X of the frame 12. Desirably, the pivot pin 60 is aligned perpendicular to the output shaft 38 of the power source 36 and is aligned perpendicular to the input shaft 46 of the transmission 44.

Referring again to FIG. 3, the input shaft 46 of the transmission 44 has a central axis B which is located a distance $d_1$ from the pivot point 62. The distance $d_1$ can vary. Typically, the distance $d_1$ ranges from between about 2 inches to about 12 inches. Desirably, the distance $d_1$ ranges from between about 2 inches to about 11 inches. More desirably, the distance $d_1$ ranges from between about 3 inches to about 10 inches. Even more desirably, the distance $d_1$ ranges from between about 4 inches to about 9 inches. In addition, the pivot point 62 is located a distance $d_2$ when measured perpendicular to a horizontal axis $X_1$-$X_1$ which extends through the central axis B of the input shaft 46. The distance $d_2$ can vary. The distance $d_2$ should be about 3 inches when measured perpendicular to the horizontal axis $X_1$-$X_1$. Desirably, the distance $d_2$ should be about 2.5 inches when measured perpendicular to the horizontal axis $X_1$-$X_1$. More desirably, the distance $d_2$ should be about 2 inches when measured perpendicular to the horizontal axis $X_1$-$X_1$. Furthermore, the central axis B of the input shaft 46 is located a horizontal distance $d_3$ from a vertical line passing through the pivot point 62. The distanced $d_3$ is measured from a vertical line passing through the pivot point 62 to a vertical axis $Y_1$-$Y_1$ passing through the point B. The distance $d_3$ can vary. Desirably, the distance $d_3$ should be less than about 3 inches. More desirably, the distance $d_3$ should be less than about 2.5 inches. Even more desirably, the distance $d_3$ should be less than about 2 inches.

Still referring to FIG. 3, the output shaft 48 of the transmission 44 has a central axis, indicated by the letter C. The output shaft 48 should be arranged such that it lies on a horizontal plane that is located vertically above a horizontal plane which passes through the pivot point 62. The vertical height of the pivot point 62 relative to the location of the central axis B of the output shaft 48 can be measured from one of the pair of frame rails 20 and 22. In other words, the output shaft 48 of the transmission 44 should be located at a height h above the pivot pin 62. The height h can vary in dimension. Desirably, the height h ranges from between about 1 inch to about 4 inches. More desirably, the height h ranges from between about 1 inch and about 3 inches. Even more desirably, the height h ranges from between about 1.5 inches to about 2.5 inches. This arrangement will provide a drive setup to the rear wheel 72 that will function smoothly without encountering excessive play in the drive mechanism 74.

Referring to FIGS. 1, and 4-6, the assembly 10 further includes a swing arm 64. The swing arm 64 has a first end 66 which is designed to be attached to the pivot pin 60 and a second end which is bifurcated into two laterally spaced apart ends 68 and 70. The second ends 68 and 70 extend rearward from the first end 66. The first end 66 is designed to pivot on the pivot pin 60 while the second ends 68 and 70 are designed to support a rear wheel 72, see FIG. 1, therebetween. The rear wheel 72 can move vertically relative to the frame 12 as the swing arm 64 pivots on the pivot pin 60. The rear wheel 72 can include a sprocket, a rim, etc. as is well known to those skilled in the art. The rear wheel 72 is mechanically connected to the output shaft 48 of the transmission 44 by a drive mechanism 74, see FIG. 1. The drive mechanism 74 can be a chain, a linked chain, a drive belt, a drive shaft, etc. The rear wheel 72 can also be partially or totally covered by a rear fender 76, see FIG. 4. The rear fender 76 is secured to the frame 12 such as by a number of welds or by various kinds of fasteners (not shown).

The amount the first end 66 of the swing arm 64 pivots will be accentuated at the second ends 68 and 70. The swing arm 64 can be designed such that the second ends 68 and 70 can vertically travel from between about 2 inches to about 14 inches. Desirably, the second ends 68 and 70 will be able to vertically travel from between about 3 inches to about 12 inches. More desirably, the second ends 68 and 70 will be able to vertically travel from between about 4 inches to about 10 inches. Even more desirably, the second ends 68 and 70 will be able to vertically travel from between about 4 inches to about 8 inches.

Figure 5:
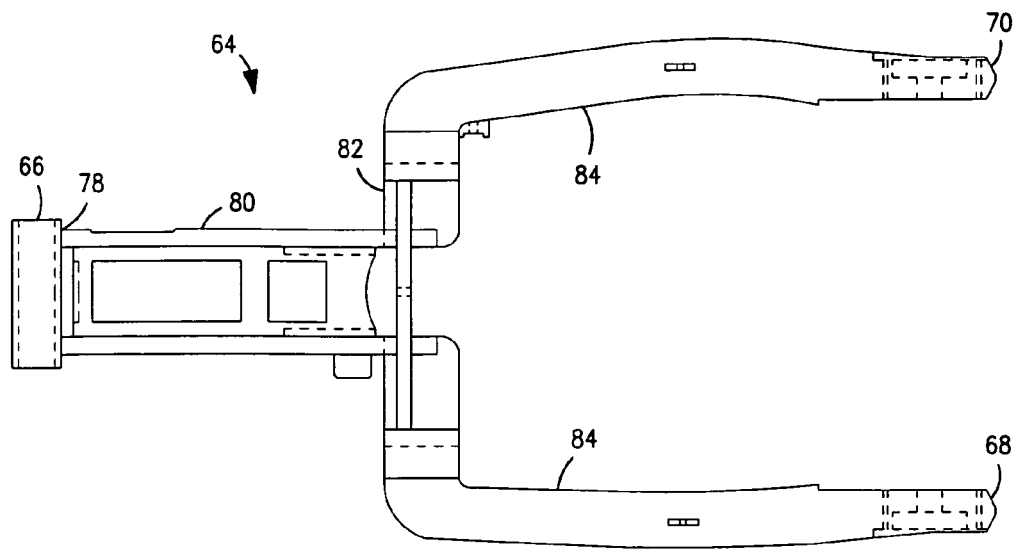
FIG. 5 is a top view of the swing arm showing a first end and a second bifurcated end between which a rear wheel can be mounted.
Figure 6:
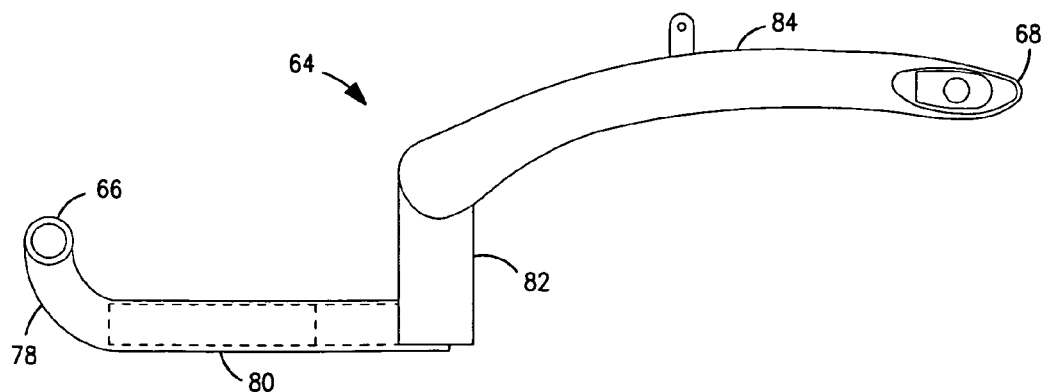
FIG. 6 is a side view the swing arm shown in FIG. 5.
Figure 7:
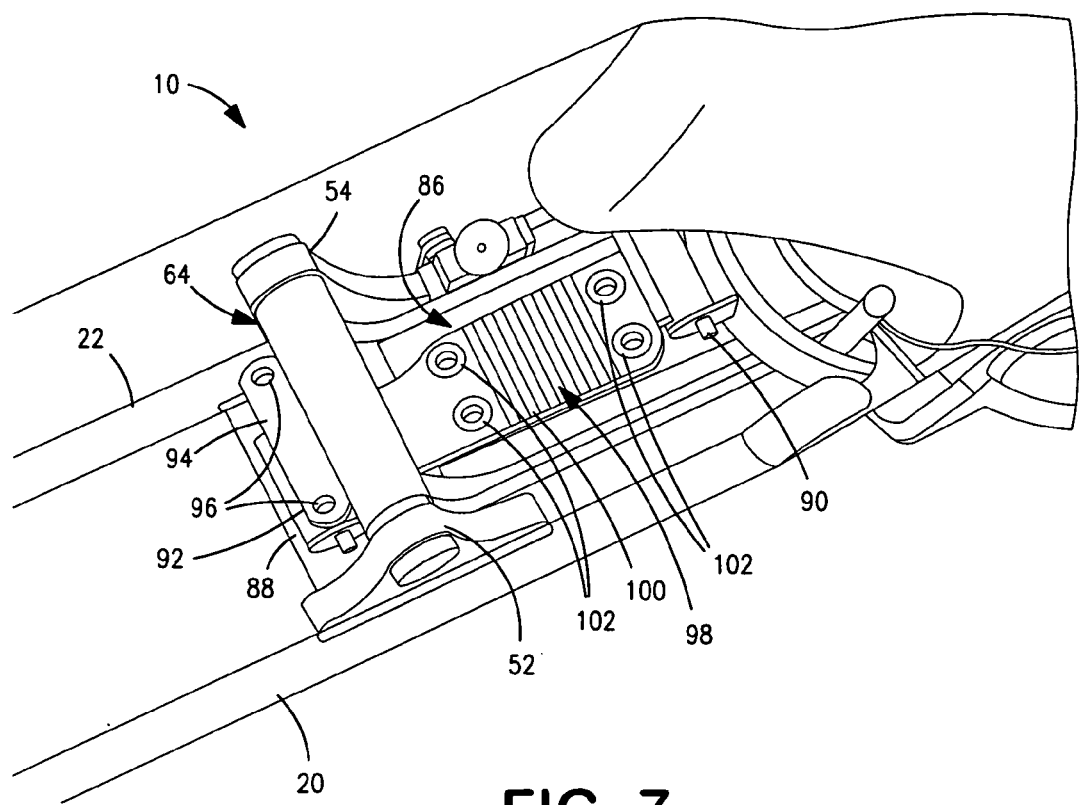
FIG. 7 is a perspective view of a portion of the assembly shown in FIG. 1 depicting the transmission mount located between and vertically above a portion of the swing arm.
Figure 8:
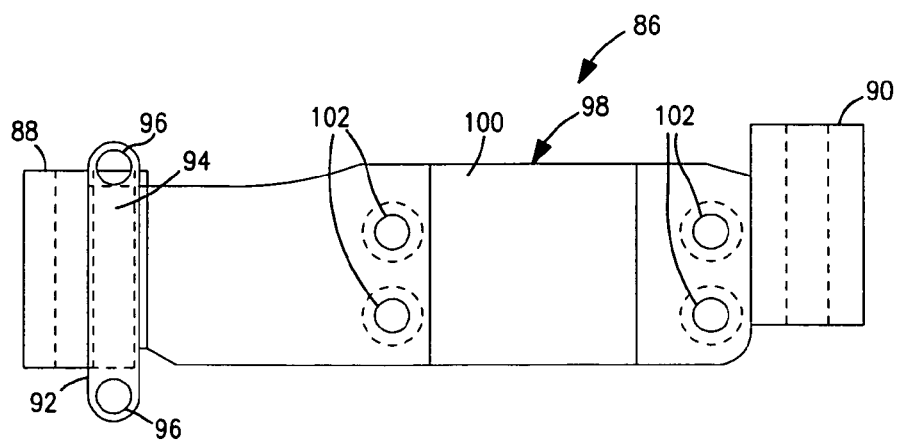
FIG. 8 is a top view of the transmission mount shown in FIG. 7.
Figure 9:
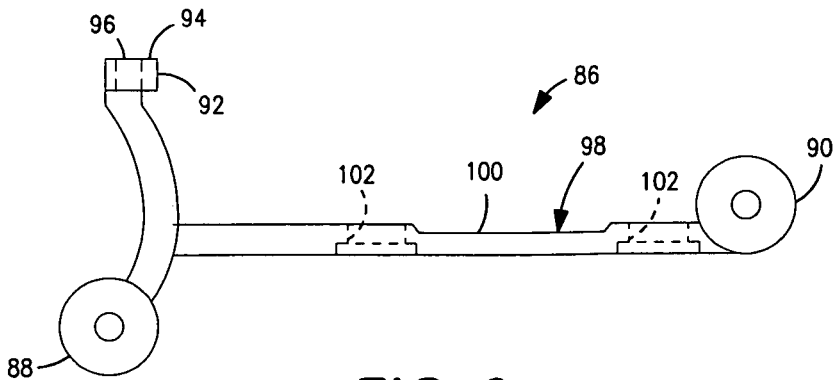
FIG. 9 is a side view of the transmission mount shown in FIG. 8.
Figure 10:
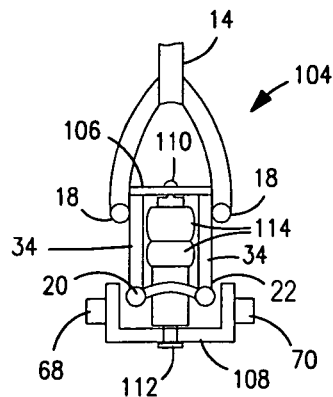
FIG. 10 is an end view of FIG. 1 taken along line 10-10, without the rear wheel, showing the suspension system which includes an air bag enclosing a shock absorber.

Referring to FIGS. 5 and 6, the swing arm 64 also includes a first section 78 having a length of about 4 inches or more. The first section 78 extends downward at an angle from the pivot pin 60 and transitions into a second section 80. The first section 78 can be in the shape of a 90 degree elbow or any variation thereof. The second section 80 extends rearward, essentially parallel to the longitudinal central axis X-X. The second section 80 has a length of at least about 12 inches. Desirably, the second section 80 has a length of at least about 16 inches. More desirably, the second section 80 has a length of at least about 18 inches. As the length of the second section 80 increases, one is more likely to obtain a smoother and a softer ride. The second section 80 transitions into a third section 82. The third section 82 can be aligned at an angle to the second section 80. Desirably, the third section 82 is aligned at a right angle or 90 degrees to the second section 80. However, the third section 82 can be aligned at any angle from 1 to 90 degrees relative to the second section 80. The third section 82 forms a step between the second and fourth sections, 80 and 84 respectively. As shown, the third section 82 extends vertically upward to a fourth section 84. The third section 82 has a length ranging from between about 4 inches to about 10 inches. Desirably, the third section 82 has a length ranging from between about 6 inches to about 8 inches. More desirably, the third section 82 has a length ranging from between about 6 inches to about 8 inches. The third section 82 can be welded to both the second section 80 and the fourth section 84.

The fourth section 84 can be linear or non-linear in appearance. In FIG. 6, the fourth section 84 is depicted as being bowed or arcuate in configuration. The fourth section 84 extends generally along the longitudinal central axis X-X but does not have to be aligned parallel thereto, unless desired. The fourth section 84 includes a pair of laterally, spaced apart members each having a length ranging from between about 18 inches to about 30 inches. Desirably, the fourth section 84 has a length ranging from between about 19 inches to about 26 inches. More desirably, the fourth section 84 has a length ranging from between about 20 inches to about 24 inches. The overall length of the swing arm 64 should be at least 36 inches or longer. This distance provides the frame 12 with a quality ride. Generally, the longer the length of the swing arm 64, the more comfortable a ride which can be obtained when the vehicle is driven.

Referring to FIGS. 2, and 7-9, the assembly 10 also includes a mounting device 86 which is positioned above at least a portion of the swing arm 64. The mounting device 86 is designed to secure both the power source 36 and the transmission 44 to the frame 12 such that the transmission 44 is aligned rearward of the power source 36. The mounting device 86 has a first end 88, in the form of a hollow cylinder, which can be attached to the frame 12 between the pair of frame rails 20 and 22. Typically, the first end 88 is bolted to the frame 12. The mounting device 86 also has a second end 90 located rearward of the first end 88, in the form of a hollow cylinder, which can also be attached to the frame 12 between the pair of frame rails 20 and 22. The second end 90 is located rearward from the first end 88 by at least 8 inches, and desirably by at least 10 inches. Typically, the second end 90 is bolted to the frame 12. The mounting device 86 has a first pad 92 which has a relatively flat upper surface 94 designed to support a portion of the power source 36, i.e. the internal combustion engine. One or more bolt holes 96, two of which are shown, can be drilled or formed in the first pad 92 to provide a means for bolting the power source 36 to the mounting device 86. The mounting device 86 also has a second pad 98 located rearward of the first pad 92. The second pad 98 has an upper surface 100 which is designed to support the transmission 44. One or more bolt holes 102, four of which are shown, can be drilled or formed in the mounting device 86 to provide a means for bolting the transmission 44 to the mounting device 86.

It should be understood that the power source 36 and the transmission 44 can be mounted at other locations as needed. Typically, both the power source 36 and the transmission 44 are secured at least two separate and distinct locations.

Referring to FIGS. 1 and 10-13, the assembly 10 further can include a suspension system 104. The suspension system 104 is secured between a stationary upper member 106 which spans between the bifurcated second ends 18, 18 of the first member 14, and a lower member 108 which spans between the second bifurcated ends 68 and 70 of the swing arm 64. The suspension system 104 is also positioned rearward of the transmission 44, see FIG. 1. Desirably, the suspension system 104 is bolted in a vertical orientation between the upper member 106 and the lower member 108 by bolts, 110 and 112 respectively.

Figure 11:
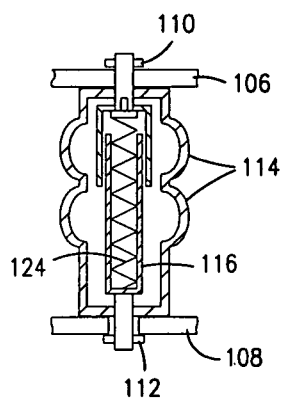
FIG. 11 is a cross-sectional view of the suspension system shown in FIG. 10 depicting a shock absorber positioned within the air bag.
Figure 12:
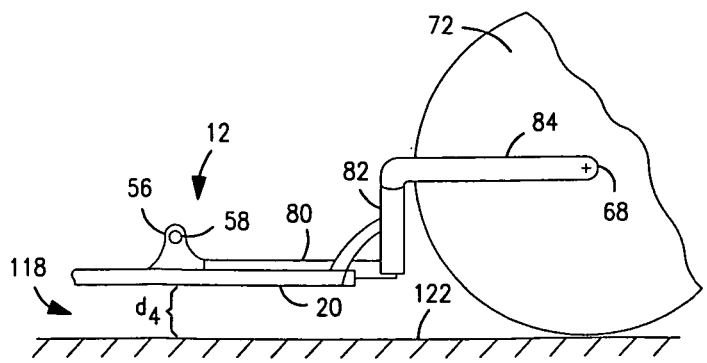
FIG. 12 is an enlarged side view of a portion of the rear wheel and frame 12 when the vehicle, i.e. a motorcycle, is in a first or riding position and elevated above an underlying support surface, i.e. the ground or a road.
Figure 13:
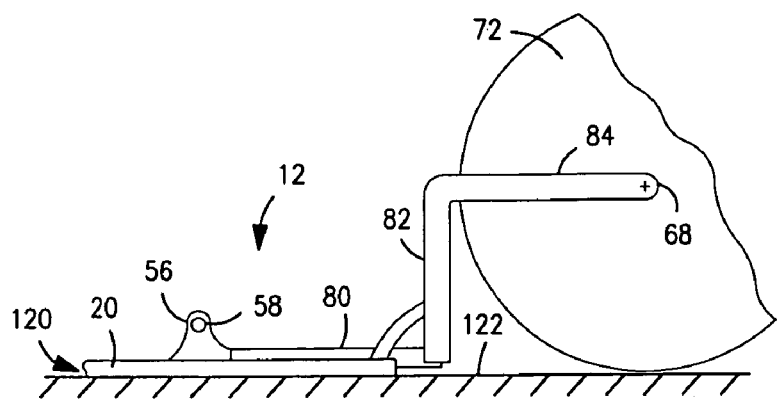
FIG. 13 is an enlarged side view of a portion of the rear wheel and frame 12 when the vehicle, i.e. a motorcycle, is in a second position resting on the underlying support surface, i.e. the ground or a road.

The suspension system 104 includes an air bag 114 and a shock absorber 116, see FIG. 11. The air bag 114 encloses and houses the shock absorber 116. The air bag 114 permits the frame 12 to move vertically between a first position 118 and a second position 120, see FIGS. 12 and 13. In the first position 118, the air bag 114 is pressurized and in the second position 120, the air bag 114 is depressurized. In the first position 118, the frame rails 20 and 22 of the assembly 10 are raised vertically or elevated above an underlying support surface 122, such as the ground or a road, by a distance $d_4$. The distance $d_4$ provides a clearance between the pair of frame rails 20 and 22 and the underlying support surface 122. The distance $d_4$ can range from between about 1 inch to about 12 inches. Desirably, the distance $d_4$ ranges from about 2 inches to about 10 inches. More desirably, the distance $d_4$ ranges from about 3 inches to about 8 inches. Even more desirably, the distance $d_4$ ranges from about 4 inches to about 7 inches. In the second position 120, the pair of frame rails 20 and 22 of the assembly 10 rests on the underlying support surface 122. In the second position 120, there is no clearance between the pair of frame rails 20 and 22 and the underlying support surface 122. Typically, in a standard size motorcycle, the distance $d_4$ between the first position 118 and the second position 120 should be at least about 4 inches.

The shock absorber 116 of the suspension system 104 provides a cushioned ride as the vehicle, i.e. a motorcycle, built with the assembly 10, is driven. By "shock absorber" it is meant a device used to absorb mechanical shocks, as a hydraulic or pneumatic piston used to dampen the jarring sustained in a moving vehicle. The shock absorber 116 is housed within the air bag 114 and is not visible by looking at the suspension system 104. The shock absorber 116 can contain a shock absorbing mechanism 124 which can include a hydraulic cylinder, a pneumatic cylinder, an air cylinder, a piston, a piston rod, one or more springs, such as helical or coil springs, one or more seals, valves, etc. The components of a shock absorbing mechanism 124 are well known to those skilled in the shock absorbing art. Simply for the purpose of illustration and not as a limiting feature, in FIG. 11, a helical or coil spring is shown as being part of the shock absorbing mechanism 124 retained within the shock absorber 116. The spring functions to bias the shock absorber 116 to an extended position.

It should be understood that the air bag 114 and the shock absorber 116 can cooperate together to provide a cushion and comfortable ride to the driver and/or passenger riding on the vehicle, i.e. the motorcycle. In this case, the air bag 114 will not be completely depressurized except when it is in the second position 120. At all other times, the air bag 114 will contain a predetermined amount of pressure so as to assist in providing a cushioned ride.

The air bag 114 and/or the shock absorber 116 function to react to movement of the lower member 108 of the swing arm 64 relative to the upper member 106 of the frame 12 as the rear wheel 72 traverses over the underlying support surface 122. For example, as the rear wheel 72 traverses uneven terrain and encounters high and low spots, such as bumps and dips, the rear wheel 72 will move vertically upward and downward. In order to cushion the ride and make it more comfortable for the driver and/or passenger riding on the vehicle, the air bag 114 and/or the shock absorber 116 will dampen the upward and downward movement. As the rear wheel 72 moves upward to ride over a bump or high spot, the air bag 114 will contract and the shock absorber 116 will compress. As the rear wheel 72 moves downward to ride over a low spot or dip, the air bag 114 will expand and the shock absorber 116 will extend in length and take up the shock of this vertical movement. The air bag 114 and/or the shock absorber 116 can react very quickly to cushion the ride as the rear wheel 72 encounters vertical variations in the underlying support surface 122.

Although not shown but known to those skilled in the art, it is customary to provide the front wheel assembly with shock absorbers as well. The combination of the front and rear shock absorbers will provide the motorcycle with a comfortable and cushioned ride.

Figure 14:
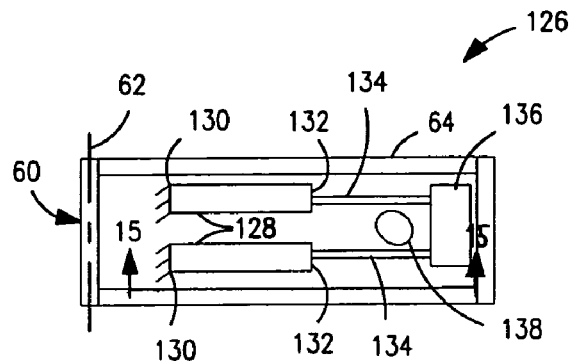
FIG. 14 is a top view of a safety mechanism positioned adjacent to the swing arm and which extends rearward from the pivot pin showing the relationship between a safety block and a movable bumper when the pair of frame rails are resting on an underlying support surface and the motorcycle is in a second or parked position.
Figure 15:
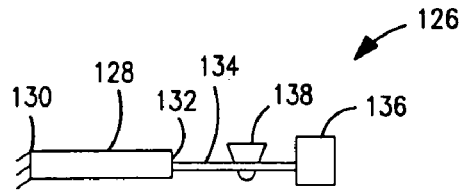
FIG. 15 is a side view of the safety mechanism depicted in FIG. 14 taken along line 15-15 when the pneumatic cylinders are extended and the motorcycle is in a second or parked position.
Figure 16:
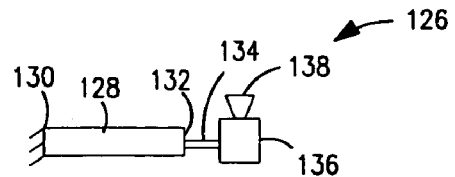
FIG. 16 is a side view of the safety mechanism depicted in FIG. 14 when the pneumatic cylinders are retracted and the motorcycle is in a first or riding position.

Referring now to FIGS. 14-16, the assembly 10 can further include a safety mechanism 126. The safety mechanism 126 can have various shapes and can be positioned in various locations on the frame 12. As one example, the safety mechanism 126 can cooperate or communicate with the swing arm 64 and can be located rearward of the pivot pin 60. The safety mechanism 126 can move between an activated and a non-activated condition. In other words, the safety mechanism 126 has to be manually activated before the frame 12 can move from the first or riding position to the second or parked position. The safety mechanism 126 includes a pair of cylinders 128 each secured at a first end 130 to a portion of the swing arm 64. Each cylinder 128 can be a pneumatic cylinder or a hydraulic cylinder or any other kind of cylinder known to those skilled in the art. It should be understood that a single cylinder 128 could be used in place of the pair of cylinders 128. As shown, the pair of cylinders 128 is aligned parallel to one another in a spaced apart relationship. Each cylinder 128 has a second end 132 with a movable piston rod 134 extending outward therefrom. In FIGS. 14 and 15, the piston rods 134 are in an extended position while in FIG. 16, the piston rod 134 is in a retracted position. Each cylinder 128 also includes an internal spring return mechanism (not shown) which biases the piston rods 134 back into the cylinders 128. The spring return mechanism biases each piston rod 134 back to a default, or bottom of the stroke position.

The safety mechanism 126 also has a safety block 136 secured to the free end of each of the pistons 134. The safety block 136 will move back and forth as the piston rods 134 are retracted into or extend outward from the cylinders 128. The safety mechanism 126 further includes a bumper 138 which extends downward from a portion of the frame 12. The bumper 138 can be formed from various materials. Desirably, the bumper 138 is formed from rubber, urethane, polyurethane, an elastomeric material or from a polymeric material. The bumper 138 can vary in size, shape and configuration. In FIGS. 14-16, the bumper 138 is depicted as a semi-spherically shaped member having a circular cross-sectional configuration. In the first or riding position, as depicted in FIG. 16, the piston rods 134 will be retracted into each of the respective cylinders 128 and the safety block 136 will be positioned vertically below the bumper 138. In this position, the bumper 138, which is secured to the frame 12, will be unable to move downward. This means that one can ride the motorcycle for there will be clearance between the pair of frame rails 20 and 22 and the underlying support surface 122. One does not need to worry or fear that the pair of frame rails 20 and 22 will drop or move downward toward the underlying support surface 122 because the safety block 136 will physically prevent this from occurring. Normally, the pair of frame rails 20 and 22 will be elevated at least about 4 inches above the underlying support surface 122.

In order to permit the motorcycle to drop vertically down to the second or parked position wherein the pair of frame rails 20 and 22 will rest upon the underlying support surface 122, the safety mechanism 126 has to be activated. This means that it takes affirmative action in the form of pressurizing the cylinders 128, to overcome the biasing force of the return spring mechanism so that the piston rods 134 can be extended. In order to extend the piston rods 134 from the cylinders 128, the rider or user must perform an affirmative action, such as depressing a button, flipping a lever, manipulating a switch, etc. to permit the assembly 10 to move from the first position 120 to the second position 122. The button, lever or switch can be secured to the handle bars of the motorcycle or to another portion of the frame 12. The handle bars (not shown) would be directly or indirectly connected to the steering neck 28. The button, lever or switch can be electrically or mechanically connected to the air bag 114.

In FIGS. 14 and 15, the safety mechanism 126 is in a second or parked position and the piston rods 134 have been extended out of each of the cylinders 128. In this position, the bumper 138 is free to move downward since the safety block 136 has been moved sideways away from bumper 138. With the pair of frame rails 20 and 22 resting on the underlying support surface, i.e. the ground, sidewalk, parking lot, road, etc., the motorcycle cannot be ridden.

With this invention, it is not necessary to equip the motorcycle or motorized vehicle with a kickstand in order to maintain the motorcycle or motorized vehicle in an upright orientation while it is parked. The pair of laterally spaced apart frame rails 20 and 22 is capable of maintaining the motorcycle in a stable upright position while it is parked provided the underlying support surface is relatively flat. The pair of frame rails 20 and 22 should also be capable to retaining the motorcycle in an upright position on a slight incline or a slight decline.

It should be understood that the air bag 114 is simultaneously or sequentially activated by the affirmative action which activates the safety mechanism 126. A command, in the form of an electrical or mechanical signal, is needed to activate the air bag 114 such that it can be depressurized. This action is needed to allow the pair of frame rails 20 and 22 to move vertically downward and contact the underlying support surface 122. Only when this occurs, can the assembly 10 be lowered into the second or parked position. When in the second or parked position, the pair of frame rails 20 and 22 will directly rest on the underlying support surface 122.

From the second or parked position, the assembly 10 can again be elevated or moved to the first or riding position by depressing the button, flipping the lever, manipulating the switch, etc. so that the air bag 114 is again pressurized and will raise the pair of frame rails 20 and 22 off of the underlying support surface 122. Simultaneously or sequentially, the pair of cylinders 128 will be depressurized and the return spring mechanism will cause the piston rods 134 to retract into each of the respective cylinders 128. This action will move the safety block 136 vertically under the bumper 138 and assure the rider that the motorcycle cannot return to the second or parking position while the motorcycle is being driven. Even if the air bag 114 becomes depressurized for any reason, the safety block 136 will physically prevent the pair of frame rails 20 and 22 from returning to the second or parked position during use.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An assembly comprising:
    a) a frame;
    b) a power source mounted to said frame and having an output shaft extending outward therefrom;
    c) a single transmission mounted to said frame and located rearward of said power source, said transmission having an input shaft and an output shaft both extending outward therefrom in the same direction as said output shaft of said power source, said output shaft of said transmission being axially spaced rearward from said input shaft of said transmission, and said input shaft of said transmission being located rearward of and connected to said output shaft of said power source; and d) a swing arm attached to said frame at a pivot point located between said output shaft of said power source and said input shaft of said transmission, said swing arm enabling a rear wheel to move vertically relative to said frame.

2. The assembly of claim 1 wherein said output shaft of said power source and said input shaft of said transmission are aligned parallel to one another along a horizontal plane, a pair of brackets is secured to said frame which support a horizontally aligned pivot pin, said pivot pin being axially located between said output shaft of said power source and said input shaft of said transmission, and said pivot pin has a horizontal central axis which is spaced below a central axis passing through both said output shaft of said power source and said input shaft of said transmission.

3. The assembly of claim 2 wherein said power source is mounted to said frame forward of said single transmission, said output shaft of said power source is spaced apart from and mechanically connected to said input shaft of said transmission, and said pivot pin is located forward of said input shaft of said transmission.

4. The assembly of claim 2 wherein said swing arm has a first end attached to said pivot pin and a second end which supports a rear wheel, said rear wheel being connected to said output shaft of said transmission by a drive mechanism.

5. The assembly of claim 4 further includes a longitudinal central axis extending from a front portion to a rear portion, said first end of said swing arm being attached to said frame by a said pivot pin, and said pivot pin is aligned perpendicular to said longitudinal central axis, and said input shaft of said transmission is aligned parallel to said pivot pin.

6. The assembly of claim 4 wherein said input shaft of said transmission has a central axis which is located at least 3 inches rearward of said pivot pin when measured perpendicular to a horizontal axis which extends through said central axis of said input shaft.

7. The assembly of claim 4 wherein said input shaft of said transmission has a central axis and said pivot pin is located within 12 inches of said central axis of said input shaft of said transmission.

8. The assembly of claim 3 wherein said pivot pin is positioned forward of said transmission and less than 3 inches from a vertical axis passing through a central axis of said input shaft of said transmission.

9. The assembly of claim 1 wherein a mounting device is secured to said frame and is positioned above at least a portion of said swing arm, said mounting device securing said power source and said transmission to said frame with said transmission being aligned rearward of said power source.

10. An assembly for a motorized vehicle, comprising:
a) a frame including a first member having spaced apart ends, a pair of frame rails each having a first end and a second end, said first ends converging towards one another and secured to one end of said first member and said second ends being laterally spaced apart from each other and secured to said other end of said first member;
b) a power source mounted to said frame and having an output shaft extending outward therefrom;
c) a single transmission mounted to said frame and located rearward of said power source, said transmission having an input shaft and an output shaft both extending outward therefrom in the same direction as said output shaft of said power source, said output shaft of said transmission being axially spaced rearward from said input shaft of said transmission, and said input shaft of said transmission being located rearward of and connected to said output shaft of said power source;
d) a pair of brackets each secured to one of said pair of frame rails and a pivot pin extending between said pair of brackets, said pivot pin establishing a pivot point located between said power source and said transmission; and
e) a swing arm having a first end attached to said pivot pin and a second bifurcated end extending rearward from said first end, said second bifurcated end supporting a rear wheel that can move vertically relative to said frame.

11. The assembly of claim 10 further comprising a suspension system including an air bag and a shock absorber mounted between said swing arm and said first member, said air bag and shock absorber being positioned rearward of said transmission, said shock absorber providing a cushioned ride when said motorized vehicle is driven, and said air bag permitting said frame to move between a first position and a second position, said frame being elevated above an underlying support surface when in said first position and said frame resting on said underlying support surface when in said second position.

12. The assembly of claim 11 further comprising a safety mechanism cooperating with said swing arm and located rearward of said pivot pin, said safety mechanism can move between an activated and a non-activated condition, said safety mechanism having a pair of cylinders each having a first end secured to said swing arm and a second end having a movable piston rod extending outward therefrom, each of said pair of cylinders having an internal spring return mechanism which biases each of said piston rods back into said pair of cylinders, a safety block secured to a free end of each of said piston rods which will move back and forth as each of said piston rods is extended or retracted, and a bumper which extends downward from a portion of said frame and will contact said safety blocks to prevent said piston rods from retracting beyond a predetermined point once said safety blocks contacts said bumper.

13. The assembly of claim 11 wherein said suspension system further including an air bag secured between said frame and said swing arm, and a safety mechanism communicating with said air bag and having an activated condition and a non-activated condition, wherein said safety mechanism has to be manually activated before said air bag can be depressurized and said frame can move from said first position to said second position.

14. The assembly of claim 10 wherein said first end of said swing arm is connected to said pair of brackets by a pivot pin, and said pivot pin is located between said output shaft of said power source and said input shaft of said transmission.

15. The assembly of claim 14 wherein both said output shaft of said power source and said input shaft of said transmission lies on a horizontal plane that is vertically above a horizontal plane on which said pivot pin lies when measured relative to said pair of frame rails.

16. A motorcycle frame and suspension system comprising:
a) a frame including a first member having a unitary first end and a bifurcated second end, a pair of frame rails each having a first end and a second end, a steering neck securing said unitary first end of said first member to said first ends of each of said pair of frame rails, and said second ends of each of said pair of frame rails being laterally spaced apart and secured in spaced apart locations to said bifurcated second ends of said first member;

b) an internal combustion engine mounted to said frame and having an output shaft extending outward therefrom;

c) a single transmission connected to said internal combustion engine and mounted to said frame rearward of said internal combustion engine, said transmission having an input shaft and an output shaft both extending outward therefrom in the same direction as said output shaft of said internal combustion engine, said output shaft of said transmission being axially spaced rearward from said input shaft of said transmission, and said input shaft of said transmission being located rearward of and connected to said output shaft of said internal combustion engine;

d) a pair of brackets each secured to one of said pair of frame rails and a pivot pin extending between said pair of brackets, said pivot pin establishing a pivot point located between said internal combustion engine and said transmission;

e) a swing arm having a first end pivotably attached to said pivot pin and a second bifurcated end extending rearward from said first end, said second bifurcated end supporting a rear wheel that can move vertically relative to said frame; and f) a suspension system including an air bag and a shock absorber mounted between said swing arm and said bifurcated rear portion of said first member, said air bag and shock absorber being positioned rearward of said transmission, said shock absorber providing a cushioned ride when said motorcycle is driven, and said air bag permitting said frame to move between a first position and a second position, said frame being elevated above an underlying support surface when in said first position and said frame resting on said underlying support surface when in said second position.

17. The motorcycle frame and suspension system of claim 16 wherein said pair of frame rails can move between a first position wherein said pair of frame rails are elevated above said underlying supporting surface and a second position wherein said pair of frame rails rest directly upon said underlying supporting surface.

18. The motorcycle frame and suspension system of claim 17 wherein said vertical distance between said first and second positions is at least 4 inches.

19. The motorcycle frame and suspension system of claim 17 wherein said airbag is pressurized when said pair of frame rails is in said first position and said air bag is depressurized when said pair of frame rails is in said second position.

20. The motorcycle frame and suspension system of claim 16 further comprising a safety mechanism communicating with said air bag and having an activated condition and a non-activated condition, wherein said safety mechanism has to be manually activated before said pair of frame rails can move from said first position to said second position.

* * * * *